May 29, 1951  C. L. KEY  2,554,495
APPARATUS FOR SEPARATING SOLIDS ACCORDING
TO THEIR SPECIFIC GRAVITIES
Filed Oct. 16, 1945  2 Sheets-Sheet 2
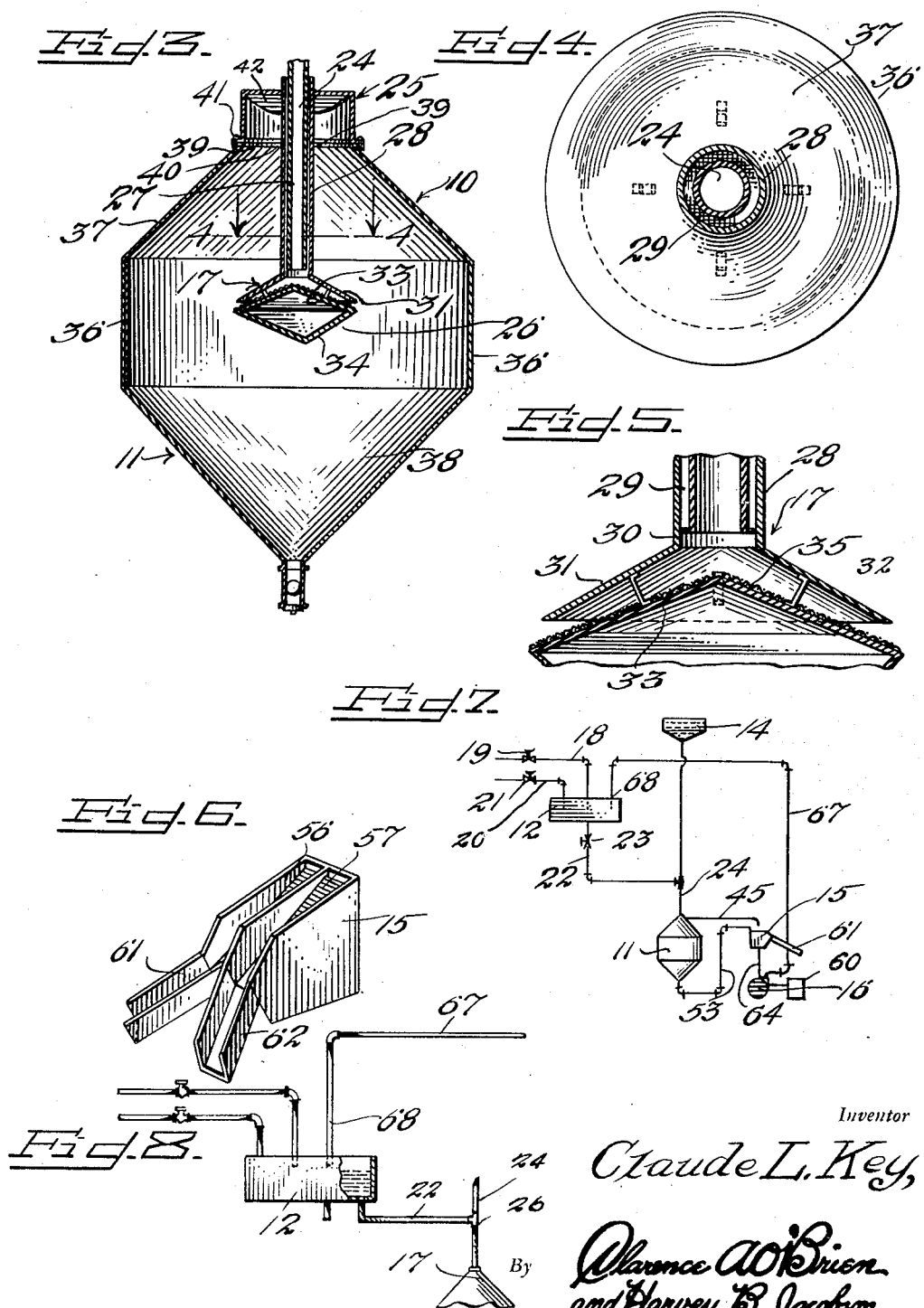
Inventor
Claude L. Key,
By Clarence A. O'Brien
and Harvey B. Jacobson
Attorneys Patented May 29, 1951

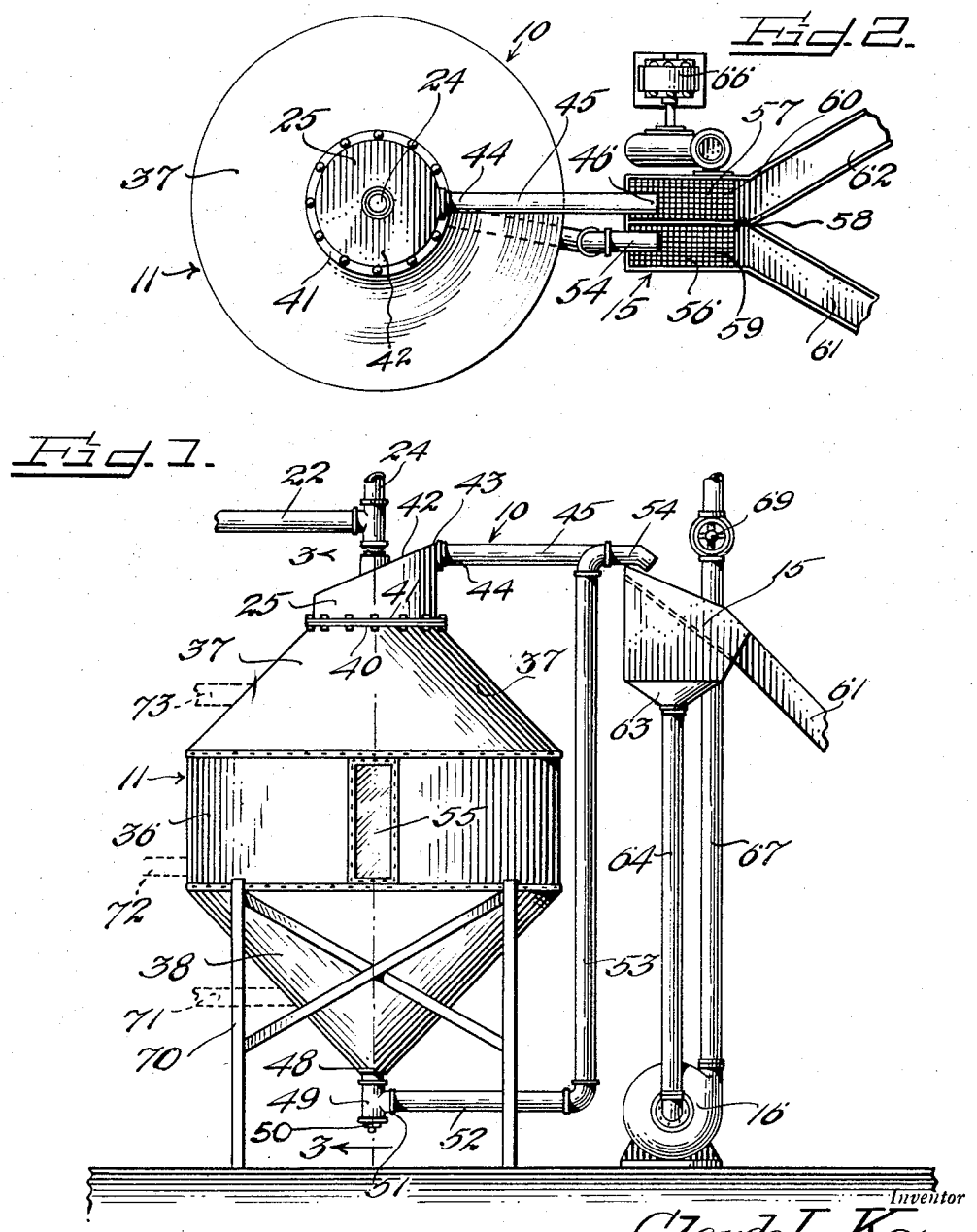

2,554,495

UNITED STATES PATENT OFFICE 2,554,495

APPARATUS FOR SEPARATING SOLIDS ACCORDING TO THEIR SPECIFIC GRAVITIES

Claude L. Key, Milton, Oreg.

Application October 16, 1945, Serial No. 622,505

1 Claim. (Cl. 209—155)

This invention relates to similar subject matter in my co-pending application, Serial No. 710,973, filed November 20, 1946.

My invention has relation to grading machines and has for its object to separate material (such as peas for instance) of different specific gravities, through immersion in a certain liquid (such as brine as an example) whereby the material of different weights will automatically separate and be passed off into different channels.

Another object of this invention is to provide a device whereby solids may be separated according to their specific gravities.

A further object of my invention is to provide a liquid filled tank within which material of varying specific gravities may be immersed and in which there is a constant circulation of the liquid and in which natural turbulence induced by circulation is overcome.

A still further object of the invention is to provide a vertical air vent pipe entering a tank filled with a circulating solution and having a supply pipe extending axially therethrough, with the lower end of the air pipe supporting a hood that is spaced above a conical baffle below the lower end of the supply pipe.

Other features and advantages will become more readily apparent from the following description and the accompanying illustrative drawings in which:

Figure 1 is an elevational view of my improved separator,

Figure 2 is a top plan view thereof, certain parts being removed,

Figure 3 is a vertical sectional view of a tank on line 3—3 of Figure 1,

Figure 4 is an enlarged detail sectional view taken on line 4—4 of Figure 3, of a distributor member, Figure 5 is a vertical section thereof, Figure 6 is a detail perspective view of a separator box, and Figures 7 and 8 are diagrammatic views of the invention.

While one embodiment of my invention is illustrated in the above referred to drawings, it is to be understood that they are merely for the purpose of illustration and that various changes in construction may be resorted to in the course of manufacture in order that the invention may be utilized to the best advantage, according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

Now referring to the drawings, 10 indicates my invention which consists of a separator tank 11, a solution mixing tank 12, a supply hopper 14, a separator 15, a pump 16, and a spreader 17. These elements are connected up in the following manner: A water pipe 18, controlled by valve 19, admits water to the tank 12, which is upon a higher plane than tank 11, and a solution pipe 20, controlled by valve 21, also empties into tank 12, whereby a solution of a character suitable for the particular material to be separated is mixed. A pipe 22, controlled by a valve 23, leads from the tank 12, to a combined gravity and suction or injector feed pipe 24, which extends from the hopper 14, down through the cap 25, of the tank 11, and to the substantial center portion 26, thereof. The inner end 27, of pipe 24, is enclosed in a sleeve 28, which is of slightly larger diameter than pipe 24, in order to provide an air space 29, between the said pipes. The end 30, of the sleeve 28, terminates in the spreader 17, which consists of an enlarged frusto-conical plate 31, which carries, spaced apart therefrom by connections 32, a conical baffle 33, superimposed upon a similar inverted cone 34, the larger diameter of the last two elements being somewhat greater than that of the plate 31. Mounted between the members 31 and 33, and spaced slightly above the latter is a similarly formed wire screen 35, the function of which will presently be stated.

The formation of the tank 11, is of the utmost importance and is such as to provide a central cylindrical, enlarged belly portion 36, a frusto-conical upper section 37, and an inverted conical lower section 38. The opening 39, of the section 37, is of sufficient diameter to permit passage of the spreader 17, and upon the flange 40, around said opening is fixed the flange 41, of said cap 25, by suitable bolts. The top wall 42, of said cap inclines to a tubular outlet 43, to which the end 44, of a pipe 45, is connected, the other end 46, of said pipe emptying into the separator box 15, of which more will be said later.

The terminal 48, of section 38, of tank 11, empties into a T-pipe 49, the bottom clean-out end of which is closed with plug 50, and the branch 51, of which connects with a pipe line 52, which extends up as at 53, to its outlet 54, into another section of box 15.

The purpose of forming tank 11, in the manner above specified with its greatly reduced outlets 43 and 48, at the extreme opposite ends of the tank is that continual circulation of the solution in the tank may obtain without in the least disturbing the equilibrium of the liquid in the belly section 36, of the tank in order that materials distributed within said section will seek their own levels within the tank without influence from the circulation of the liquid, and according to their own specific gravity. A window 55, of a depth equal to that of the section 36, is provided therein in order that the condition therein may be observed from the outside.

The separator 15, is divided into two vertical sections 56 and 57, by a central wall 58, each of which are provided with strainer walls 59 and 60, each inclining into separate chutes 61 and 62. The bottom wall 63 of the separator tapers to an outlet into pipe 64, extending down to a pump 16, driven by a motor 66. From the said pump a pipe line 67, leads to and empties into tank 12, as at 68. The pipe line 67, is provided with a valve 69. The tank 11, is supported upon a preferably angle iron framework 70.

It is of course obvious that I may supply outlet ports at different zones of the tank 11, as indicated in dotted lines, for instance at 71, 72, 73, etc., for drawing of materials, the specific gravity of which may cause them to collect at these points and depending upon the nature of the material to be separated.

The operation of my separator is simple, effective and is continuous without the necessity of attendance when once set into operation and as long as material is kept in hopper or bin 14. It will be noted that the supply pipes 22 and 24, are located on a plane above the outlet pipes 46 and 54, and as the pump 16, returns to tank 12, liquid emptied from said outlets the flow through the tank 11, is continuous, the tank being kept completely full. As the solution flows from the pipe 22, into pipe 24, it creates a forced injection of the material from pipe 24, into the tank as well as the gravity action of the material which, of course, depends upon the circumstance of its condition. The separator as illustrated has been built and is being operated especially for separating peas in the cannery of the inventor. A suitable brine solution is provided in tank 12, the bin 14, filled with peas, the valves adjusted and the motor started and peas are fed into the tank by gravity induced by the injection of the solution in the pea feed line and are dashed upon the screen 35, which separates any air brought in therewith, which air escapes through the space 29, formed by sleeve 28, the peas then rolling down the spreader into the quiet liquid zone in section 36 of the tank and automatically separate, the lighter supply flowing out through pipe 45, and the heavy out through pipe 52, and thence to the separator 15, where they are directed to separate containers not shown.

I have found that the injection of the solution into the material feed pipe completely prevents foaming which would otherwise result. The arrangement of the sleeve providing the air outlet from the plate 31, together with the impact of the peas upon the screen 35, completely evacuates air and prevents collecting of air bubbles within the tank and altogether obviates air pockets within the tank.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention as claimed may be resorted to, in actual practice, if desired.

Having now described my invention that which I claim as new and desire to procure by Letters Patent is:

In the flotation separation of solids, a substantially closed tank filled with flotation solution, said tank having an outlet port adjacent each end, a conduit extending axially into the tank through which a stream of flotation solution containing the solids to be separated is introduced into the tank, said conduit terminating intermediate the ends of the tank, a baffle within the tank adjacent the discharge end of the conduit for intercepting the stream and dislodging occluded gases from the solids contained therein, a vent surrounding the conduit for conducting the dislodged gases to atmosphere and a hood carried by the vent within the tank to collect the dislodged gases and direct them to the vent.

CLAUDE L. KEY.

REFERENCES CITED

The following references are of record in the file of this patent:

UNITED STATES PATENTS

| Number | Name | Date |
|---|---|---|
| Re. 22,191 | Wade | Sept. 29, 1942 |
| 500,662 | Lockhart | July 4, 1893 |
| 1,169,292 | Smith | Jan. 25, 1916 |
| 1,456,165 | Whitney | May 22, 1923 |
| 1,721,423 | Warren | July 16, 1929 |
| 1,780,830 | Lessing | Nov. 4, 1930 |
| 1,911,013 | Chapman | May 23, 1933 |
| 2,320,335 | Bauer | June 1, 1943 |
| 2,356,648 | Brusset | Aug. 22, 1944 |
| 2,357,566 | Walter | Sept. 5, 1944 |
| 2,373,635 | Wuensch | Apr. 10, 1945 |
| 2,379,184 | Rakowsky | June 26, 1945 |

FOREIGN PATENTS

| Number | Country | Date |
|---|---|---|
| 25,936 | Great Britain | 1912 |